United States Patent [19]

Favre

[11] Patent Number: 5,411,176
[45] Date of Patent: May 2, 1995

[54] VARIABLE DOSAGE DISTRIBUTOR FOR FLUID PRODUCTS

[75] Inventor: Bernard Favre, Chevilly-Larue, France

[73] Assignee: LIR-France, Chevilly-Larue, France

[21] Appl. No.: 139,788

[22] Filed: Oct. 22, 1993

[30] Foreign Application Priority Data

Oct. 22, 1992 [FR] France ................ 92 12660

[51] Int. Cl.6 .................... B67D 5/22; B67D 5/52
[52] U.S. Cl. .................................. 222/94; 222/137; 222/144.5; 222/282; 222/318; 222/494
[58] Field of Search ............... 222/95, 105, 94, 109, 222/135–137, 144.5, 145, 134, 494, 321, 424, 318; 222/282, 386.5

[56] References Cited

U.S. PATENT DOCUMENTS

| | | | |
|---|---|---|---|
| 2,413,136 | 12/1946 | Burger | 222/282 |
| 3,760,986 | 9/1973 | Castner | 222/137 |
| 4,549,674 | 10/1985 | Alticosalian | 222/144.5 X |
| 4,826,048 | 5/1989 | Skorka et al. | 222/145 X |
| 4,838,457 | 6/1989 | Swahl et al. | 222/145 X |
| 5,009,342 | 4/1991 | Lawrence et al. | 222/136 |
| 5,152,431 | 10/1992 | Gardner | 222/136 |
| 5,152,461 | 10/1992 | Proctor | 222/136 X |
| 5,156,299 | 10/1992 | De Caluwe et al. | 222/105 X |
| 5,224,627 | 7/1993 | Weag | 222/135 |
| 5,292,033 | 3/1994 | Gueret | 222/95 |

FOREIGN PATENT DOCUMENTS

| | | |
|---|---|---|
| 0026902 | 4/1981 | European Pat. Off. . |
| 0410857 | 1/1991 | European Pat. Off. . |
| 2542118 | 3/1977 | Germany . |
| 1376425 | 12/1974 | United Kingdom . |

*Primary Examiner*—Kevin P. Shaver
*Attorney, Agent, or Firm*—Young & Thompson

[57] ABSTRACT

Distributor for fluid products, comprising a flexible bag (1) filled with the product to be distributed and connected in a sealed manner to a pump (3) sealed from the air. A body (5) encloses the bag (1) and the pump (3). An actuating button (9) for the pump provided with an outlet for the product to be distributed. A movable member (10) is interposed between the downstream end (3') of the pump (3) and the outlet in the button (9) for the product, this movable member (10) having a first conduit (13) which in a first position of the movable member (10) places the upstream end (3') of the pump (3) directly in communication with the outlet of the button (9), and at least one second conduit comprising a direct circuit and a branch (22, 24, 25). This second conduit is so arranged that, in a second position of the movable member (10), the direct circuit (22, 24) places the downstream end (3') of the pump (3) in communication with the outlet of the button (9) while the branch (25) places the downstream end (3') of the pump (3) in communication with the upstream end of the pump (3).

8 Claims, 2 Drawing Sheets

VARIABLE DOSAGE DISTRIBUTOR FOR FLUID PRODUCTS

The invention relates to a distributor for fluid products, such as cosmetic creams, of the type comprising a flexible bag filled with the product to be distributed and connected in a sealed manner to a pump sealed from air, a body enclosing the bag and the pump and an actuating button for said pump provided with an outlet for the product to be distributed.

Such pumps have the advantage of dosed distribution of the product with each actuation of the pump. But the dose cannot be changed, which is inconvenient for certain uses. This is for example the case for a distributor-mixer which is constituted by two pumps, such as that which will be described, disposed in a same casing and actuated simultaneously by the same button. It is not possible with such a distributor-mixer to vary the dose of one of the components of the mixture, and thus its proportion in the mixture.

The present invention accordingly aims to provide a distributor of the type described in the introduction which permits varying in a simple and economic way the dose provided upon each actuation of the pump.

To this end, the distributor according to the invention is characterized in that it comprises a movable member interposed between the outlet of the pump and the outlet of the button for the product, said movable member having a first conduit which, in a first position of the movable member, is downstream of the pump directly in communication with the outlet in the button and at least a second conduit comprising a direct circuit and a branch, said second conduit being disposed such that for a second position of the movable member, the direct circuit places the downstream end of the pump in communication with the outlet in the button while the branch places the downstream end of the pump in communication with the upstream end of the pump.

By suitable calibration and orientation of the direct circuit relative to the branch in the second conduit, it is possible, in the second position of the movable member, to provide that a predetermined portion of the product dose ejected by the pump arrives at the outlet of the button while the remaining complementary portion is returned to the bag disposed upstream of the pump.

Preferably, said movable member is rotatable, and preferably indexed.

Desirably, the product outlet in the button is closed by a valve so as to avoid the entry of air into the bag. This valve is preferably constituted by a member provided with two lips in resilient contact, which ensures, in addition to the desired seal, an orientation of the jet of expelled product.

According to one embodiment of the invention, the distributor comprises moreover a second bag connected to a second pump sealed from the air and containing a second product to be mixed with the product of the first bag, the button being arranged to actuate simultaneously the two pumps, said movable member comprising a supplemental conduit connecting, in all positions of the movable member, the downstream end of the second pump to the outlet and the button. There is thus obtained a distributor-mixer permitting the dosage of one of the components of the mixture.

The invention will be better understood from a reading of the following description given with reference to the accompanying drawings, in which.

The illustrated embodiments comprise a distributor-mixer for two components of which one is provided in constant doses and the other in doses regulable according to three different values.

Figure 2:
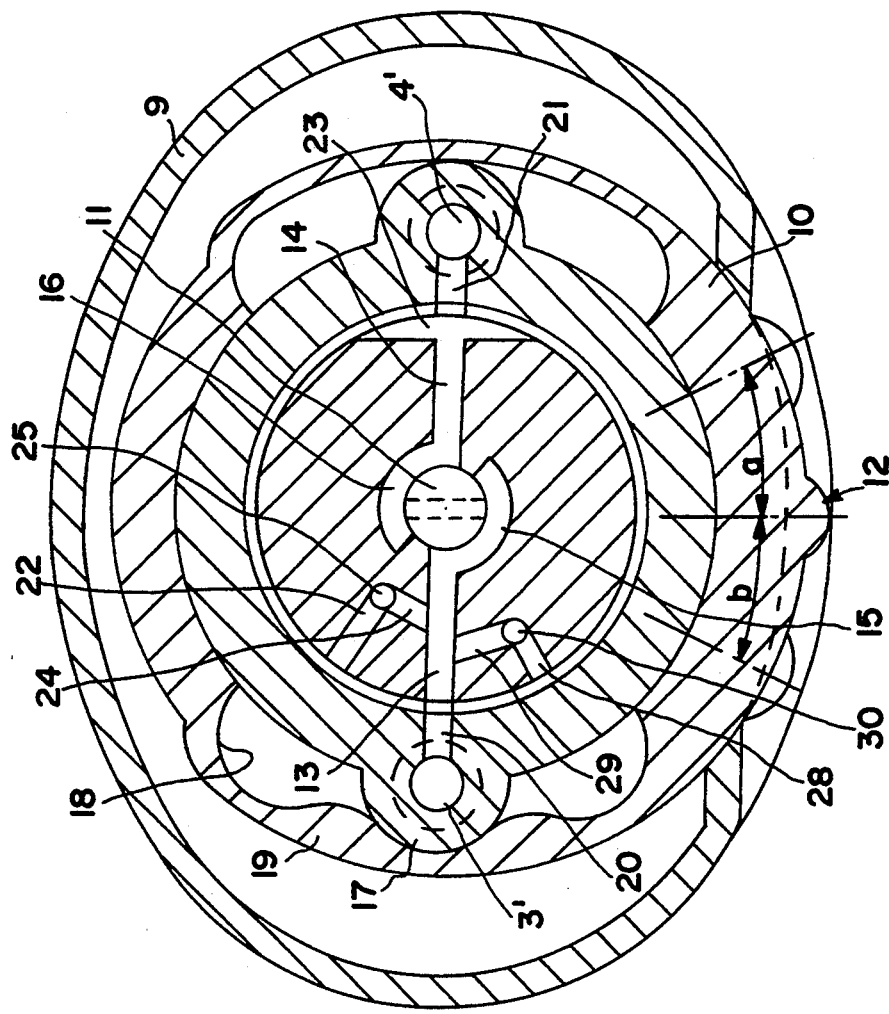
FIG. 2 is an enlarged schematic transverse cross-sectional view of the device of the FIG. 1.
Figure 1:
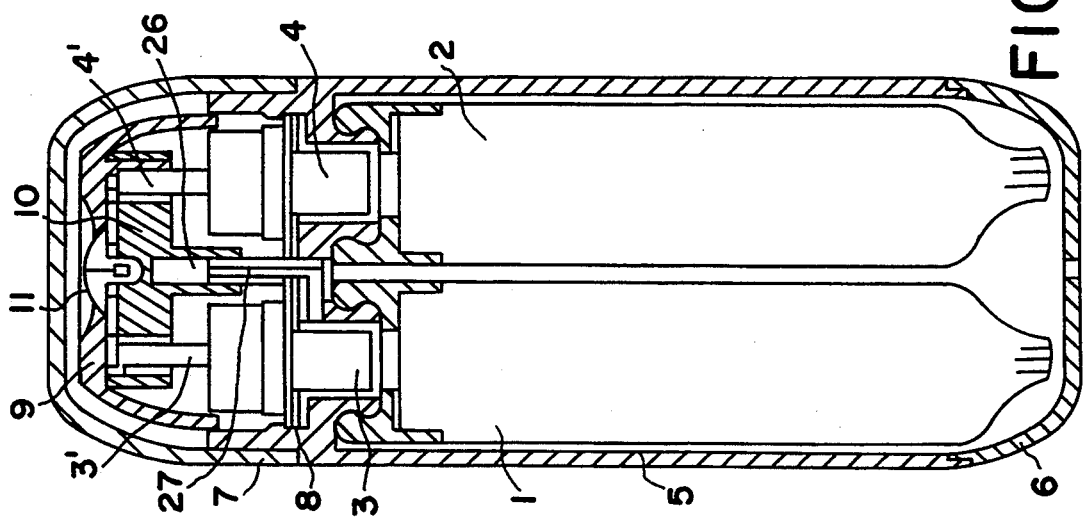
FIG. 1 is a schematic view in axial cross section of a distributor-mixer according to one embodiment of the invention.

In the embodiment of FIGS. 1 and 2, the distributor comprises two flexible bags 1 and 2 mounted in a sealed manner upstream of two pumps 3 and 4 sealed from the air. The assembly is disposed in a body 5 closed at its lower portion by a bottom 6. A cover or cap 7 permits closing the assembly when not in use. The two pumps 3, 4 are fixed in the body 5 by means of a common joint 8. A button 9 bears on the ejector tubes 3', 4' of the pumps 3, 4 so as to actuate them simultaneously.

A rotatable member 10, fixed to the button 9, is disposed so as to be interposed between the downstream end of the pumps 3 and 4 and the common outlet in the button 9, which outlet is closed by a valve 11. This valve 11 is preferably constituted by a member provided with two lips in resilient contact with each other, so as to close automatically to prevent penetration of air.

The rotatable member 10 (FIG. 2) comprises an actuating projection 12 accessible from outside and is provided with two diametrically opposed radial conduits 13 and 14 whose central portions 15 and 16 empty respectively facing the valve 11. The rotatable member 10 can be indexed to three positions by means of a projection 17 of the button 9 coacting with notches 18 in a flexible portion 19 of the member 10.

In the central angular position of the rotatable member 9, shown in FIG. 2, the radial conduits 13 and 14 face, by their external ends, channel 20, 21 of the button 9 each of which opens at its other end at the upstream ends of the pumps 3, 4. The dispensed materials flowing through each of the pumps 3, 4 upon each actuation of the button 9 mix upon arriving at the valve 11 whose lips separate elastically to let them pass, in a directed jet, the total of the two doses being added and mixed together. If the pumps 3 and 4 are identical, the doses that flow are of course equal.

In a position of the member 9 offset by an angle a relative to the above central position, a conduit 22 faces the channel 20 while the conduit 14 remains in direct communication with the channel 21 by means of a mouthpiece 23. The conduit 22 communicates by an elbow 24 with a conduit 13 and, by a branch 25, with a hollow volume 26 which communicates with the bag 1 through a tube 27 which, as is seen in FIG. 1, passes through the joint 8. The arrangement is such that only 60% of the dose ejected by the pump 3 arrives at the valve 11, the rest being returned to the bag 1 by the volume 26 and the tube 27. Air is prevented from penetrating by the closing of the lips of the valve 11.

In an angular position offset by angle b, the communication of the upstream end 3' of the pump 3 with the outlet is ensured by a conduit 28 and an elbow 29, a branch 30 carrying in this case about 70% of the dose ejected to the volume 26.

The device which has been described is delivered to the supplier with the bags 1, 2 empty and open at their lower portion. The bottom 6 is not assembled. The filling of the bags 1 and 2 takes place for the respective products, through their lower open ends. These ends are then sealed, for example by welding, and the bottom 6 is snapped on.

Figure 3:
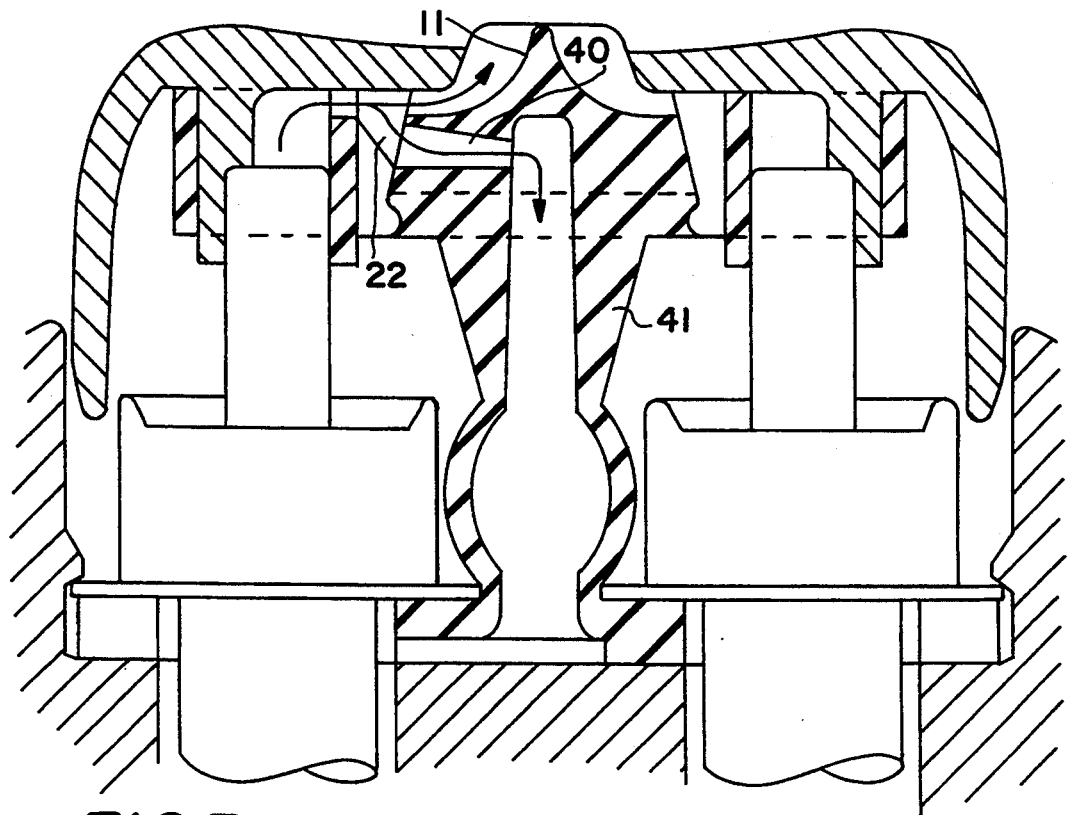
FIG. 3 is a fragmentary cross section of the distributor-mixer according to a modified embodiment.
Figure 4:
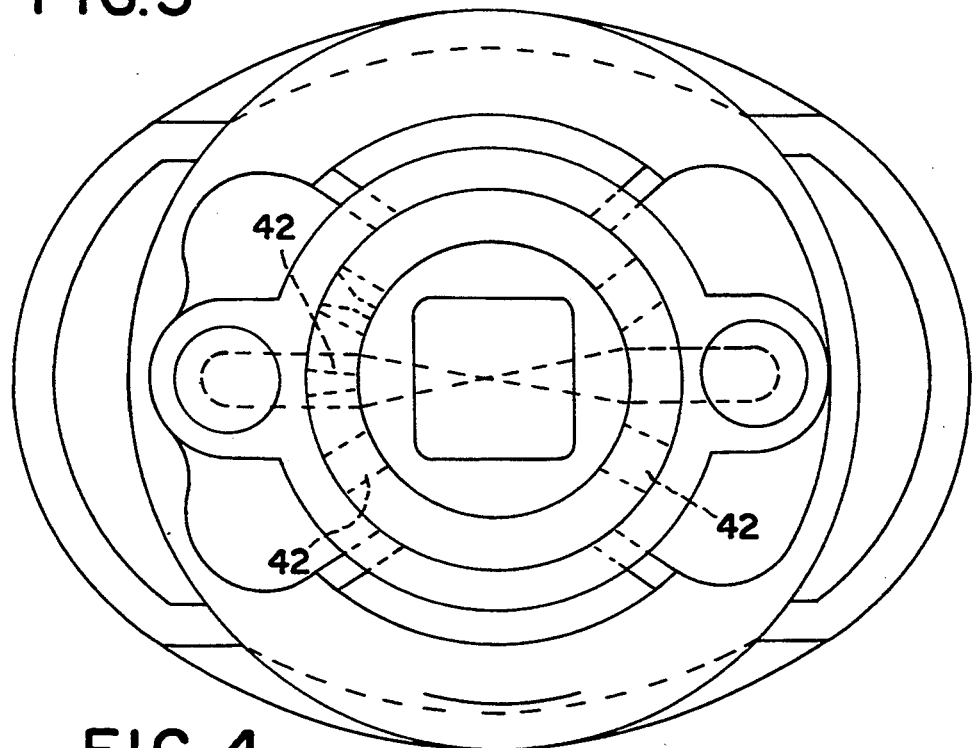
FIG. 4 is a view similar to FIG. 2, but showing the embodiment of FIG. 3.

In the modified embodiment of FIGS. 3 and 4, the return of the surplus is effected through a channel 40 provided in a fixed elastomeric member 41. The member 41 ensures at the same time the purpose of the above joint 8. The rotatable control member 9 is provided with conduits 42 for calibrating the flow, in the form of different constrictions.

What is claimed is:

1. Distributor for fluid products, comprising a flexible bag (1) filled with the product to be distributed and connected in a sealed manner to a pump (3) sealed from the air, a body (5) enclosing the bag (1) and the pump (3), and an actuating button (9) for said pump provided with an outlet for the product to be distributed, a movable member (10) interposed between the downstream end (3') of the pump (3) and the outlet in the button (9) for the product, said movable member (10) having a first conduit (13) which in a first position of the movable member (10) places an upstream end of the pump (3) directly in communication with the outlet of the button (9), and at least one second conduit comprising a direct circuit and a branch (22, 24, 25), said direct circuit (22, 24) in a second position of the movable member placing a downstream end (3') of the pump (3) in communication with the outlet of the button (9) while the branch (25) places the downstream end of the pump (3) in communication with the upstream end of the pump (3).

2. Distributor according to claim 1, wherein said movable member (10) is rotatable.

3. Distributor according to claim 1, wherein said movable member (10) has indexing means (17, 18) for releasably fixing the position of the movable member (10).

4. Distributor according to claim 1, wherein the product outlet in the button (9) is closed by a valve (11).

5. Distributor according to claim 4, wherein said valve (11) is constituted by a member provided with two lips in resilient contact with each other.

6. Distributor according to claim 1, which comprises also a second bag (2) connected to a second pump (4) sealed from the air and containing a second product to be mixed with the product in the first bag (1), the button (9) being so arranged as to actuate simultaneously the two pumps (3, 4), said movable member (10) comprising a supplemental conduit (14) connecting in all positions of the movable member (10) the downstream end of the second pump (4) to the outlet in the button (9).

7. Distributor according to claim 1, which comprises a fixed member (47) of elastomer comprising channels (40) for conveying surplus product and comprising a joint for the pump (3, 4).

8. Distributor according to claim 1, wherein the button (9) comprises a plurality of calibrating conduits (42) for the flow of product, the conduits having different size constrictions.

* * * * *